(12) United States Patent
Chung et al.

(10) Patent No.: US 9,631,087 B2
(45) Date of Patent: Apr. 25, 2017

(54) THERMOPLASTIC RESIN COMPOSITION AND MOLDED PRODUCTS THEREOF

(71) Applicant: CHEIL INDUSTRIES INC., Gumi-si, Gyeongsangbuk-do (KR)

(72) Inventors: Jin Hwa Chung, Uiwang-si (KR); Kee Hae Kwon, Uiwang-si (KR); Joo Hyun Jang, Uiwang-si (KR); Ja Kwan Goo, Uiwang-si (KR); Kwang Soo Park, Uiwang-si (KR)

(73) Assignee: LOTTE ADVANCED MATERIALS CO., LTD., Yeosu-si (KR)

( * ) Notice: Subject to any disclaimer, the term of this patent is extended or adjusted under 35 U.S.C. 154(b) by 0 days.

(21) Appl. No.: 14/365,091

(22) PCT Filed: Dec. 5, 2012

(86) PCT No.: PCT/KR2012/010470
§ 371 (c)(1),
(2) Date: Jun. 12, 2014

(87) PCT Pub. No.: WO2013/094898
PCT Pub. Date: Jun. 27, 2013

(65) Prior Publication Data
US 2014/0371375 A1    Dec. 18, 2014

(30) Foreign Application Priority Data

Dec. 19, 2011 (KR) .................. 10-2011-0137735
Dec. 23, 2011 (KR) .................. 10-2011-0141788

(51) Int. Cl.
*C08L 69/00* (2006.01)
*C08L 33/10* (2006.01)

(52) U.S. Cl.
CPC .............. *C08L 69/00* (2013.01); *C08L 33/10* (2013.01)

(58) Field of Classification Search
CPC ......... C08F 22/16; C08F 220/18; C08L 33/10
See application file for complete search history.

(56) References Cited

U.S. PATENT DOCUMENTS

| | | | |
|---|---|---|---|
| 5,166,270 A | 11/1992 | Hungenberg et al. | |
| 6,391,418 B1 | 5/2002 | Ueda et al. | |
| 7,354,980 B1 | 4/2008 | Mentak | |
| 8,440,760 B2 | 5/2013 | Kim et al. | |
| 8,541,506 B2 | 9/2013 | Kwon et al. | |
| 2008/0154008 A1 | 6/2008 | Jeong et al. | |
| 2010/0152357 A1* | 6/2010 | Kwon et al. .................. | 524/502 |
| 2010/0197850 A1* | 8/2010 | Kim ....................... | C08F 220/18 524/502 |
| 2010/0256288 A1 | 10/2010 | Kim et al. | |
| 2014/0371344 A1 | 12/2014 | Chung et al. | |

FOREIGN PATENT DOCUMENTS

| | | |
|---|---|---|
| CN | 101747610 A | 6/2010 |
| CN | 101768347 A | 7/2010 |
| CN | 101827872 A | 9/2010 |
| CN | 102007183 A | 4/2011 |
| CN | 102115585 A | 7/2011 |
| JP | 03 124764 * | 5/1991 |
| JP | 2006-199732 A | 8/2006 |
| JP | 2006-313089 A | 11/2006 |
| JP | 2011-500914 A | 1/2011 |
| KR | 10-0504967 B1 | 7/2005 |
| KR | 10-0665806 B1 | 1/2007 |
| KR | 10-0885819 B1 | 2/2009 |
| KR | 10-2009-0039612 A | 4/2009 |
| KR | 10-2009-0066204 A | 6/2009 |
| KR | 10-2010-0050778 A | 5/2010 |
| TW | 200936688 A | 9/2009 |
| WO | WO 2009/113573 A1 | 9/2009 |
| WO | WO 2009/128601 A1 | 10/2009 |

OTHER PUBLICATIONS

JP 03 124764 partial translation (1991).*
English Abstract of KR 20070002376 A which corresponds to KR 10-0665806 B1, 1 page.
International Search Report for PCT/KR2012/010470, mailed on Feb. 19, 2013, 2 pages.
Chinese Office Action dated Feb. 27, 2015, for corresponding Chinese Patent Application No. 2012-80062877.2, 8 pages.
US Office action dated Jun. 26, 2015 in cross-reference U.S. Appl. No. 14/365,991, 12 pages.
US Office action dated Nov. 13, 2015 in cross-reference U.S. Appl. No. 14/365,991, 13 pages.
SIPO Office action dated Aug. 5, 2015 in Chinese Application No. 201180075738.9, 8 pages.
International Search Report issued in International Application No. PCT/KR2011/010333, dated Nov. 23, 2012, 4 pgs.
EPO Search Report dated Jul. 23, 2015, for corresponding European Patent application 12860942.7, (6 pages).
Japan Office action dated Aug. 30, 2016, corresponding to Japanese Patent Application No. 2014-547090 (4 pages).

* cited by examiner

*Primary Examiner* — Kuo-Liang Peng
(74) *Attorney, Agent, or Firm* — Lewis Roca Rothgerber Christie LLP

(57) ABSTRACT

A thermoplastic resin composition according to the present invention is characterized by comprising: (A) a polycarbonate resin; and (B) a biphenyl group-containing (meth)acrylic copolymer. As such, the refractive index of the biphenyl group-containing (meth)acrylic copolymer (B) can be approximately from 1.495 to 1.640. The thermoplastic resin composition exhibits superior balance of material properties such as impact strength, internal scratch resistance, transparency, thermal resistance and appearance.

17 Claims, No Drawings

THERMOPLASTIC RESIN COMPOSITION AND MOLDED PRODUCTS THEREOF

CROSS-REFERENCE TO RELATED APPLICATIONS

This application is a National Phase Patent Application and claims priority to and the benefit of International Application Number PCT/KR2012/010470, filed on Dec. 5, 2012, which claims priority to Korean Patent Application No. 10-2011-0137735, filed on Dec. 19, 2011, and Korean Patent Application No. 10-2011-0141788, filed on Dec. 23, 2011, the entire contents of all of which are incorporated herein by reference.

TECHNICAL FIELD

The present invention relates to a thermoplastic resin composition and a molded product thereof. More particularly, the present invention relates to a thermoplastic resin composition including a biphenyl group-containing (meth) acrylic copolymer and a polycarbonate resin, and a molded product thereof.

BACKGROUND ART

Thermoplastic resins exhibit excellent physical properties such as low specific gravity, good moldability and good impact resistance, as compared with glass or metal. With the trend of low cost, larger and lighter weight electric and electronic products, plastic products made of thermoplastic resins are quickly replacing existing glass or metal-based products, thereby broadening applications thereof from electric and electronic products to automobile components. In line with this trend, functions as exterior materials and external appearance are increasingly important. In addition, there is a strong need for resins having good scratch resistance for ensuring stability from exterior shock or scratch or flame retardancy for ensuring stability against fire.

Polycarbonate resins exhibit not only excellent mechanical strength, flame retardancy, transparency and weather resistance, but also good impact resistance, thermal stability. However, the polycarbonate resins have a drawback in that they exhibit very poor scratch resistance.

Acrylic resins, specifically, polymethyl methacrylate (PMMA) resins, have excellent transparency, weather resistance, mechanical strength, surface gloss, adhesion, and, particularly, remarkably excellent scratch resistance. However, the acrylic resins have drawbacks of very poor impact resistance and flame retardancy.

In order to overcome these problems while achieving mechanical properties including impact resistance and scratch resistance, a polymethyl methacrylate (PMMA) resin is prepared by copolymerization of monomers having high indices of refraction, or a polycarbonate (PC)/PMMA resin is prepared by mixing polycarbonate (PC) and acrylic resins, for example, PMMA. In addition, to improve resin compatibility of PC/PMMA, an acrylic copolymer having a high index of refraction is employed to prepare an alloy resin of polycarbonate and acrylic resins having high flame retardancy and scratch resistance. However, the copolymer of the monomers having high indices of refraction has a limit in improvement of refractivity or heat resistance. Moreover, the alloy resin of polycarbonate and acrylic resin exhibit almost no flame retardancy due to a low content of a flame retardant and is likely to suffer from deterioration in mechanical properties including heat resistance when containing a flame retardant.

DISCLOSURE

Technical Problem

It is an aspect of the present invention to provide a thermoplastic resin composition which exhibits excellent properties in terms of Heat resistance, impact resistance and scratch resistance.

It is another aspect of the present invention to provide a thermoplastic resin composition which exhibit good balance between flame retardancy, transparency, coloring properties, and mechanical properties.

It is a further aspect of the present invention to provide a thermoplastic resin composition which maintains transparency upon blending with an acrylic copolymer exhibiting high compatibility with polycarbonate.

It is yet another aspect of the present invention to provide a thermoplastic resin composition which does not generate flow marks upon application of rubber-modified vinyl graft copolymer.

It is yet another aspect of the present invention to provide a plastic molded product prepared using the thermoplastic resin composition.

Technical Solution

One aspect of the present invention relates to a thermoplastic resin composition. The thermoplastic resin composition includes (A) a polycarbonate resin; and (B) a biphenyl group-containing (meth)acrylic copolymer.

In some embodiments, the (B) biphenyl group-containing (meth)acrylic copolymer may have an index of refraction ranging from about 1.495 to about 1.640.

In a first embodiment, the thermoplastic resin composition may include about 50 percent by weight (wt %) to about 99 wt % of the (A) polycarbonate resin, and about 1 wt % to about 50 wt % of the (B) biphenyl group-containing (meth)acrylic copolymer.

In a second embodiment, the thermoplastic resin composition may include about 1 wt % to about 49 wt % of the (A) polycarbonate resin, and about 51 wt % to about 99 wt % of the (B) biphenyl group-containing (meth)acrylic copolymer.

In some embodiments, the (B) biphenyl group-containing (meth)acrylic copolymer may contain a derivative unit obtained from monomers including about 1 wt % to about 50 wt % of (b1) a biphenyl group-containing (meth)acrylate having an index of refraction from about 1.580 to about 1.700, optionally, about 99 wt % or less of (b2) a monofunctional unsaturated monomer, and, optionally, about 50 wt % or less of (b3) an alicyclic or aromatic (meth)acrylate having an index of refraction from about 1.490 to about 1.579.

In some embodiments, the (b1) biphenyl group-containing (meth)acrylate may be represented by Formula 1:

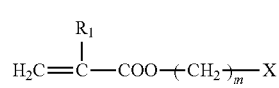

[Formula 1]

wherein $R_1$ is hydrogen or a methyl group; m is an integer from 0 to 10; and X is selected from the group consisting of a substituted or unsubstituted biphenyl group, and a substituted or unsubstituted terphenyl group.

In some embodiments, the (b2) monofunctional unsaturated monomer may include at least one of a $C_1$ to $C_8$ alkyl (meth)acrylate; an unsaturated carboxylic acid including (meth)acrylic acid; an acid anhydride including maleic anhydride; a hydroxyl group-containing (meth)acrylate; (meth)acrylamide; unsaturated nitrile; allyl glycidyl ether; glycidyl methacrylate; and an aromatic vinyl monomer.

In some embodiments, the (b3) alicyclic or aromatic (meth)acrylate having an index of refraction from about 1.490 to about 1.579 may include a compound represented by Formula 2, a compound represented by Formula 3, or mixtures thereof:

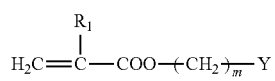
[Formula 2]

wherein $R_1$ is hydrogen or a methyl group; m is an integer from 0 to 10, and Y is a substituted or unsubstituted $C_6$ to $C_{20}$ cycloalkyl group, or a substituted or unsubstituted $C_6$ to $C_{20}$ aryl group;

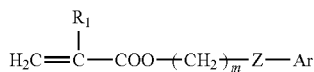
[Formula 3]

wherein $R_1$ is hydrogen or a methyl group; m is an integer from 0 to 10; Z is oxygen (O) or sulfur (S); Ar is a substituted or unsubstituted $C_6$ to $C_{20}$ cycloalkyl group, or a substituted or unsubstituted $C_6$ to $C_{20}$ aryl group.

In some embodiments, the (B) biphenyl group-containing (meth)acrylic copolymer may have a weight average molecular weight from about 3,000 g/mol to about 300,000 g/mol.

In some embodiments, the (B) biphenyl group-containing (meth)acrylic copolymer may have a non-crosslinked structure.

In some embodiments, the (B) biphenyl group-containing (meth)acrylic copolymer may have a glass transition temperature from about 90° C. to about 150° C., and may permit extrusion or injection at a temperature higher than or equal to the glass transition temperature.

In a third embodiment, the thermoplastic resin composition may further include (C) a rubber-modified vinyl graft copolymer resin.

In some embodiments, the (C) rubber-modified vinyl graft copolymer resin may have a core-shell structure in which an unsaturated monomer is grafted onto a core rubber to form a shell. Wherein, the unsaturated monomer may include at least one of a $C_1$ to $C_{12}$ alkyl (meth)acrylate, an acid anhydride, and a $C_1$ to $C_{12}$ alkyl or phenyl-nuclear substituted maleimide.

In some embodiments, the thermoplastic resin composition may further include at least one of flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, antistatic agents, pigments, and dyes.

Another aspect of the present invention relates to a molded product produced from the thermoplastic resin composition.

In some embodiments, the molded product may be formed of the thermoplastic resin composition according to the first embodiment, and may have a scratch width from about 180 µm to about 350 µm as measured in accordance with Ball-type Scratch Profile Test and a pencil hardness from 2B to 3H.

In some embodiments, the molded product may be formed of the thermoplastic resin composition according to the second embodiment, and may have a total light transmittance of about 85% or more, a scratch width of about 210 µm or less as measured in accordance with Ball-type Scratch Profile Test, and a heat resistace (Vicat softening temperature: VST) of about 110° C. or more (under conditions of a load of 5 Kg at 50° C./hr) in accordance with ASTM D1525.

In some embodiments, the molded product may be formed of the thermoplastic resin composition according to the third embodiment, and may have a total light transmittance of about 40% or more, a scratch width from about 280 µm or less as measured in accordance with Ball-type Scratch Profile Test, a heat resistace (Vicat softening temperature: VST) of about 105° C. or more (under conditions of a load of 5 Kg at 50° C./hr) in accordance with ASTM D1525, and a ⅛" Izod notch impacted strength of about 8 kg·cm/cm or higher in accordance with ASTM D256.

Advantageous Effects

The present invention provides thermoplastic resin compositions, which exhibit excellent properties in terms of thermal resistance, flame retardancy, scratch resistance, mechanical properties, and transparency to be suitably applied to electric/electronic products, maintain excellent properties of acrylic resins such as transparency, scratch resistance, and the like, and have improved impact resistance. In addition, plastic molded products having superior properties to existing products may be produced using the thermoplastic resin composition and may be advantageously applied to various electric/electronic products or automobile components.

Best Mode

Hereinafter, embodiments of the present invention will be described in detail. However, it should be understood that the following embodiments are given by way of illustration only and the present invention is not limited thereto. The scope of the present invention is defined only by the claims and equivalents thereof.

As used herein, the term "(meth)acrylic" may refer to both "acrylic" and "methacrylic", unless otherwise specifically stated. For example, "(meth)acrylate" means both "acrylate" and "methacrylate".

As used herein, the term "substituted" means that at least one hydrogen atom in a compound is substituted with a halogen atom (F, Cl, Br or I), a hydroxyl group, a nitro group, a cyano group, an amino group, an azido group, an amidino group, a hydrazino group, a hydrazono group, a carbonyl group, a carbamyl group, a thiol group, an ester group, a carboxyl group or salts thereof, a sulfonic acid group or salts thereof, a phosphoric acid group or salts thereof, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_6$ to $C_{30}$ aryl group, a $C_6$ to $C_{30}$ aryloxy group, a $C_3$ to $C_{30}$ cycloalkenyl group, a $C_3$ to $C_{30}$ cycloalkynyl group, or combinations thereof.

A thermoplastic resin composition according to the present invention includes (A) a polycarbonate resin, and (B) a biphenyl group-containing (meth)acrylic copolymer. Here, the biphenyl group-containing (meth)acrylic copolymer (B) may have an index of refraction from about 1.495 to about 1.640.

In a first embodiment, the thermoplastic resin composition may include about 50 wt % to about 99 wt % of the (A) polycarbonate resin, and about 1 wt % to about 50 wt % of the (B) biphenyl group-containing (meth)acrylic copolymer.

Here, the polycarbonate resin (A) may be present in an amount of about 50 wt % to about 99 wt %, preferably about 55 wt % to about 95 wt %, more preferably about 60 wt % to about 90 wt %, in the thermoplastic resin composition including (A) and (B). Within this range, the thermoplastic resin composition exhibits good balance between mechanical properties and scratch resistance.

In addition, the biphenyl group-containing (meth)acrylic copolymer (B) may be present in an amount of about 1 wt % to about 50 wt %, preferably about 5 wt % to about 45 wt %, more preferably about 10 wt % to about 40 wt %, for example, about 10 wt % to about 30 wt %, in the thermoplastic resin composition including (A) and (B). Within this range, the thermoplastic resin composition has sufficiently improved scratch resistance and can prevent deterioration in impact and mechanical properties.

In a second embodiment, the thermoplastic resin composition may include about 1 wt % to about 49 wt % of the (A) polycarbonate resin, and about 51 wt % to about 99 wt % of the (B) biphenyl group-containing (meth)acrylic copolymer.

Here, the polycarbonate resin (A) may be present in an amount of about 1 wt % to about 49 wt %, preferably about 10 wt % to about 40 wt %, more preferably about 15 wt % to about 35 wt %, in the thermoplastic resin composition including (A) and (B). Within this range, the polycarbonate resin can exhibit excellent mechanical properties, and the resin composition has scratch resistance corresponding to a pencil hardness level of H or higher.

In addition, the biphenyl group-containing (meth)acrylic copolymer (B) may be present in an amount of about 51 wt % to about 99 wt %, preferably about 60 wt % to about 90 wt %, more preferably about 65 wt % to about 85 wt %, in the thermoplastic resin composition including (A) and (B). Within this range, the thermoplastic resin composition has sufficiently improved scratch resistance, and can prevent deterioration in impact resistance and mechanical properties.

Further, the thermoplastic resin composition according to the invention may further include (C) a rubber-modified vinyl graft copolymer resin and/or (D) a phosphorus-based flame retardant, as needed.

In a third embodiment, the thermoplastic resin composition according to the second embodiment may further include about 30 parts by weight or less of the (C) rubber-modified vinyl graft copolymer resin, for example, about 30 parts by weight or less, preferably about 3 parts by weight to about 20 parts by weight, based on 100 parts by weight of the thermoplastic resin composition including (A) and (B).

Within this range, the thermoplastic resin composition can provide reinforcement effects, while improving mechanical strength such as tensile strength, flexural strength, flexural modulus, and the like.

In a fourth embodiment, the thermoplastic resin composition according to the first embodiment may further include, optionally, about 30 parts by weight or less of the (C) rubber-modified vinyl graft copolymer resin, and about 30 parts by weight or less of the (D) phosphorus-based flame retardant, based on 100 parts by weight of the thermoplastic resin composition including (A) and (B).

Wherein, the rubber-modified vinyl graft copolymer (C) may be optionally present in an amount of about 30 parts by weight or less, preferably about 3 parts by weight to about 20 parts by weight, based on 100 parts by weight of the thermoplastic resin composition including (A) and (B). Within this range, the thermoplastic resin composition can provide reinforcement effects, while improving mechanical strength such as tensile strength, flexural strength, flexural modulus, and the like.

In addition, the phosphorus-based flame retardant (D) may be optionally present in an amount of about 30 parts by weight or less, preferably about 3 parts by weight to about 20 parts by weight, based on 100 parts by weight of the thermoplastic resin composition including (A) and (B). Within this range, the thermoplastic resin composition can secure flame retardancy without deterioration in other properties.

In a fifth embodiment, the thermoplastic resin composition according to the first embodiment may further include, optionally, about 30 parts by weight or less of the (C) rubber-modified vinyl graft copolymer resin, preferably about 3 parts by weight to about 20 parts by weight, based on 100 parts by weight of the thermoplastic resin composition including (A) and (B).

Within this range, the thermoplastic resin composition can provide reinforcement effects, while improving mechanical strength such as tensile strength, flexural strength, flexural modulus, and the like.

In a sixth embodiment, the thermoplastic resin composition according to the first embodiment may further include, optionally, about 30 parts by weight or less of the (D) phosphorus-based flame retardant, preferably about 3 parts by weight to about 20 parts by weight, based on 100 parts by weight of the thermoplastic resin composition including (A) and (B).

Within this range, the thermoplastic resin composition can secure flame retardancy without deterioration in other properties.

Next, the respective components of the thermoplastic resin composition according to the present invention will be described in more detail.

(A) Polycarbonate Resin

According to the present invention, the polycarbonate resin may be prepared by a typical method. For example, the polycarbonate resin may be prepared by reacting a dihydric phenol compound with phosgene in the presence of a molecular weight regulator and a catalyst. In another embodiment, the polycarbonate resin may also be prepared through transesterification of a dihydric phenol compound and a carbonate precursor such as diphenyl carbonate.

In the preparation of the polycarbonate resin, the dihydric phenol compound may be a bisphenol compound, preferably 2,2-bis(4-hydroxyphenyl)propane ("bisphenol A"). Here, the bisphenol A may be partially or fully replaced by other dihydric phenol compounds. Examples of the other dihydric phenol compounds may include hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, halogenated bisphenol, such as bis(4-hydroxyphenyl)ether or 2,2-bis(3,5-dibromo-4-hydroxyphenyl)propane, and the like.

However, it should be understood that the dihydric phenol compound which can be used for preparation of the polycarbonate resin is not limited thereto, and the polycarbonate resin may be prepared using any dihydric phenol compound.

In addition, the polycarbonate resin may include a homopolymer using one dihydric phenol compound, copolymers using at least two dihydric phenol compounds, or mixtures thereof.

Generally, the polycarbonate resin may be a linear polycarbonate resin, a branched polycarbonate resin, a polyester carbonate copolymer resin, or the like. The polycarbonate resin included in the thermoplastic resin composition according to the present invention may include such linear polycarbonate resins, branched polycarbonate resins, and polyester carbonate copolymer resins, without being limited thereto.

For example, the linear polycarbonate resin may be a bisphenol A polycarbonate resin, and the branched polycarbonate resin may be prepared by, for example, reacting a polyfunctional aromatic compound, such as trimellitic anhydride, trimellitic acid and the like, with a dihydric phenol compound and a carbonate precursor. In addition, the polyester carbonate copolymer resin may be prepared by, for example, reacting a bifunctional carboxylic acid with dihydric phenol and a carbonate precursor. In addition to the above materials, the polycarbonate resin may include typical linear polycarbonate resins, branched polycarbonate resins, or polyester carbonate copolymer resins, without limitation.

Herein, these polycarbonate resins may be used alone or as mixtures thereof.

(B) Biphenyl Group-Containing (Meth)Acrylic Copolymer

The biphenyl group-containing (meth)acrylate copolymer (B) may be a copolymer of (b1) a biphenyl group-containing (meth)acrylate having an index of refraction from about 1.580 to about 1.700 and (b2) a monofunctional unsaturated monomer.

In some embodiments, the biphenyl group-containing (meth)acrylic copolymer (B) may contain a derivative unit obtained from monomers including about 1 wt % to about 50 wt % of the (b1) biphenyl group-containing (meth)acrylate having an index of refraction from about 1.580 to about 1.700, optionally, about 99 wt % or less of the (b2) monofunctional unsaturated monomer, and, optionally, about 50 wt % or less of (b3) an alicyclic or aromatic (meth)acrylate having an index of refraction from about 1.490 to about 1.579. Details of the monomers will be described hereinafter.

(b1) Biphenyl Group-Containing (Meth)Acrylate Having an Index of Refraction from about 1.580 to about 1.700

According to the present invention, the biphenyl group-containing (meth)acrylate (b1) has an index of refraction from about 1.580 to about 1.700, and contains a biphenyl structure.

In some embodiments, the biphenyl group-containing (meth)acrylate (b1) may be a compound represented by Formula 1.

[Formula 1]

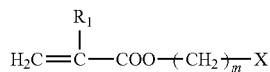

wherein $R_1$ is hydrogen or a methyl group; m is an integer from 0 to 10; and X is selected from the group consisting of a substituted or unsubstituted biphenyl group, and a substituted or unsubstituted terphenyl group. For example, X may be an o-biphenyl group, a m-biphenyl group, a p-biphenyl group, a 2,6-terphenyl group, an o-terphenyl group, a m-terphenyl group, or a p-terphenyl group.

Examples of the biphenyl group-containing (meth)acrylate (b1) may include o-biphenyl methacrylate, m-biphenyl methacrylate, p-biphenyl methacrylate, 2,6-terphenyl methacrylate, o-terphenyl methacrylate, m-terphenyl methacrylate, p-terphenyl methacrylate, 4-(4-methylphenyl)phenyl methacrylate, 4-(2-methylphenyl)phenyl methacrylate, 2-(4-methylphenyl)phenyl methacrylate, 2-(2-methylphenyl)phenyl methacrylate, 4-(4-ethylphenyl)phenyl methacrylate, 4-(2-ethylphenyl)phenyl methacrylate, 2-(4-ethylphenyl)phenyl methacrylate, and 2-(2-ethylphenyl)phenyl methacrylate, without being limited thereto. These may be used alone or in combination thereof.

The aromatic (meth)acrylate (b1) unit may be present in an amount of about 1 wt % to about 50 wt % in the (meth)acrylate copolymer (B). Within this range, the resin composition can obtain good property balance of high index of refraction, transparency, and thermal resistance. Preferably, the aromatic (meth)acrylate (b1) unit is present in an amount of about 5 wt % to about 40 wt %, for example, about 10 wt % to about 35 wt %. Within this range, the resin composition can obtain better property balance between high index of refraction and thermal resistance.

(b2) Monofunctional Unsaturated Monomer

According to the present invention, the monofunctional unsaturated monomer (b2) is a monomer containing a single unsaturated group. For example, the monofunctional unsaturated monomer (b2) may include a $C_1$ to $C_8$ alkyl (meth)acrylate; an unsaturated carboxylic acid including (meth)acrylic acid; an acid anhydride including maleic anhydride; a hydroxyl group-containing (meth)acrylate; (meth)acrylamide; unsaturated nitrile; allyl glycidyl ether; glycidyl methacrylate; an aromatic vinyl monomer; and mixtures thereof. These may be used alone or in combination thereof.

Examples of the monofunctional unsaturated monomer (b2) may include methyl methacrylate, ethyl methacrylate, propyl methacrylate, butyl methacrylate, methyl acrylate, ethyl acrylate, propyl acrylate, butyl acrylate, 2-ethylhexyl acrylate, acrylic acid, methacrylic acid, maleic anhydride, 2-hydroxyethyl acrylate, 2-hydroxypropyl acrylate, monoglycerol acrylate, acrylamide, methacrylamide, acrylonitrile, methacrylonitrile, allyl glycidyl ether, glycidyl methacrylate, styrene, alpha-methylstyrene, without being limited thereto. Preferably, the monofunctional unsaturated monomer (b2) is a $C_1$ to $C_8$ alkyl (meth)acrylate, more preferably a $C_1$ to $C_4$ alkyl (meth)acrylate. In this case, the resin composition can exhibit better scratch resistance and transparency.

In some embodiments, a mixture of methacrylate and acrylate may be used. In this case, the methacrylate and the acrylate may be mixed in a ratio of about 15:1 to about 45:1. Within this range, the resin composition can exhibit excellent thermal stability and fluidity.

The monofunctional unsaturated monomer (b2) may be optionally present in an amount of about 99 wt % or less, preferably about 50 wt % to about 95 wt %, more preferably about 55 wt % to about 89 wt %, in the (meth)acrylate copolymer (B). Within this range, the resin composition has good property balance between scratch resistance, fluidity, transparency, and flame retardancy.

(b3) Alicyclic or Aromatic (Meth)Acrylate Having an Index of Refraction from about 1.490 to about 1.579

According to the invention, the alicyclic or aromatic (meth)acrylate (b3) has an index of refraction from about 1.490 to about 1.579, and may be a compound represented by Formula 2, a compound represented by Formula 3, or mixtures thereof.

[Formula 2]

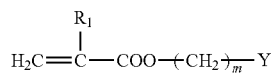

wherein $R_1$ is hydrogen or a methyl group; m is an integer from 0 to 10; and Y is a substituted or unsubstituted $C_6$ to $C_{20}$ cycloalkyl group, or a substituted or unsubstituted $C_6$ to $C_{20}$ aryl group.

For example, Y may be a cyclohexyl group, a phenyl group, a methylphenyl group, a methylethylphenyl group, a methoxyphenyl group, a propylphenyl group, a cyclohexylphenyl group, a chlorophenyl group, a bromophenyl group, a benzylphenyl group, and the like.

[Formula 3]

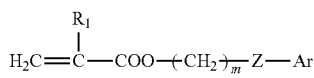

wherein $R_1$ is hydrogen or a methyl group; m is an integer from 0 to 10; Z is oxygen (O) or sulfur (S); and Ar is a substituted or unsubstituted $C_6$ to $C_{20}$ cycloalkyl group, or a substituted or unsubstituted $C_6$ to $C_{20}$ aryl group.

For example, Ar may be a cyclohexyl group, a phenyl group, a methylphenyl group, a methylethylphenyl group, a methoxyphenyl group, a cyclohexylphenyl group, a chlorophenyl group, a bromophenyl group, a benzylphenyl group, and the like.

Examples of the alicyclic or aromatic (meth)acrylate (b3) may be methacryl acid, such as cyclohexyl methacrylate, phenoxy methacrylate, 2-ethylphenoxy methacrylate, benzyl methacrylate, phenyl methacrylate, 2-ethylthiophenyl methacrylate, 2-phenylethyl methacrylate, 3-phenylpropyl methacrylate, 4-phenylbutyl methacrylate, 2-2-methylphenyl ethyl methacrylate, 2-3-methylphenylethyl methacrylate, 2-4-methylphenylethyl methacrylate, 2-(4-propylphenyl)ethylmethacrylate, 2-(4-(1-methylethyl)phenyl) ethylmethacrylate, 2-(4-methoxyphenyl)ethylmethacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, and the like. These may be used alone or in combination thereof.

The alicyclic or aromatic (meth)acrylate (b3) unit may be optionally present in an amount of about 50 wt % or less, preferably 40 wt % or less, more preferably about 1 wt % to about 35 wt % in the (meth)acrylate copolymer (B). Within this range, the resin composition has improved property balance between index of refraction and thermal resistance.

The biphenyl group-containing (meth)acrylic copolymer (B) of the present invention may be prepared by typical polymerization known in the art, for example, bulk polymerization, emulsion polymerization or suspension polymerization. Preferably, the biphenyl group-containing (meth)acrylic copolymer (B) is prepared by suspension polymerization.

In some embodiments, the biphenyl group-containing (meth)acrylic copolymer (B) may be prepared by polymerization of a monomer mixture including about 1 wt % to about 50 wt % of the (b1)biphenyl group-containing (meth)acrylate having an index of refraction from about 1.580 to about 1.700, optionally, about 99 wt % or less of the (b2) monofunctional unsaturated monomer, and, optionally, about 50 wt % or less of the (b3) alicyclic or aromatic (meth)acrylate having an index of refraction from about 1.490 to about 1.579. For example, a mixed reaction liquid is prepared by adding a polymerization initiator and a chain-transfer agent to the monomer mixture, followed by suspension polymerization by introducing the mixed reaction liquid into an aqueous solution including a suspension stabilizer dissolved therein.

Polymerization temperature and polymerization time may be appropriately adjusted. For example, polymerization may be performed at about 65° C. to about 125° C., preferably at about 70° C. to about 120° C., for about 2 hours to about 8 hours.

The polymerization initiator may be a typical radical polymerization initiator known in the art. Examples of the polymerization initiator may include octanoyl peroxide, decanoyl peroxide, lauroyl peroxide, benzoyl peroxide, monochlorobenzoyl peroxide, dichlorobenzoyl peroxide, p-methylbenzoyl peroxide, tert-butyl perbenzoate, azobisisobutyronitrile, and azobis-(2,4-dimethyl)-valeronitrile, without being limited thereto. These may be used alone or in combination thereof. The polymerization initiator may be present in an amount of about 0.01 parts by weight to about 10 parts by weight, for example, about 0.03 parts by weight to about 5 parts by weight, based on 100 parts by weight of the monomer mixture.

The chain-transfer agent may be used to adjust the weight average molecular weight of the (meth)acrylate copolymer (B) and to improve heat stability thereof. The weight average molecular weight may also be adjusted by the amount of the polymerization initiator included in the monomer mixture. However, if polymerization is stopped by the chain-transfer agent, an end of a chain has a second carbon structure. The end of the chain having the second carbon structure has stronger bonding strength than an end of a chain paving a double-bond created when the chain-transfer agent is not used. Thus, addition of the chain-transfer agent can improve heat stability of the (meth)acrylate copolymer (B), thereby improving optical properties thereof.

The chain-transfer agent may be a typical chain-transfer agent known in the art. Examples of the chain-transfer agent may include: alkyl mercaptan in the form of $CH_3(CH_2)_nSH$ (where n is an integer from 1 to 20) including n-butyl mercaptan, n-octyl mercaptan, n-dodecyl mercaptan, t-dodecyl mercaptan, isopropyl mercaptan, n-amyl mercaptan, and the like; halogenated compounds including carbon tetrachloride, and the like; and aromatic compounds including α-methylstyrene dimers and α-ethylstyrene dimers, without being limited thereto. These may be used alone or in combination thereof. The chain-transfer agent may be present in an amount of about 0.01 parts by weight to about 10 parts by weight, preferably about 0.02 parts by weight to about 5 parts by weight, based on 100 parts by weight of the monomer mixture. Within this range, the resin composition can have heat stability and suitable molecular weight.

In addition, the biphenyl group-containing (meth)acrylic copolymer (B) may be polymerized by further adding at least one of additives including suspension stabilizers, suspension stabilization aids, antioxidants, and the like in the monomer mixture. The additive may be present in an amount of about 0.001 parts by weight to about 20 parts by weight, based on 100 parts by weight of the monomer mixture, without being limited thereto.

The suspension stabilizer may include: organic suspension stabilizers including polyalkyl acrylate-acrylic acid, polyolefin-maleic acid, polyvinyl alcohol, cellulose, and the like; inorganic suspension stabilizers including tricalcium phosphate, and the like; and mixtures thereof, without being limited thereto.

The suspension stabilization aids may include disodium hydrogen phosphate, sodium dihydrogen phosphate and the like, and may also include sodium sulfate in order to control solubility of a water-soluble polymer or monomer.

The antioxidant may be octadecyl 3-(3,5-di-tert-butyl-4-hydroxyphenyl) propionate, triethylene glycol-bis-3 (3-tert-butyl-4-hydroxy-5-methylphenyl) propionate, 2,6-di-tert-butyl-4-methyl phenol, 2,2'-methylenebis(4-methyl-6-tert-butylphenol), tri(2,4-di-tert-butylphenyl) phosphite, n-octadecyl-3(3,5-di-tert-butyl-4-hydroxyphenyl) propionate, 1,3,5-tri(3,5-di-tert-butyl-4-hydroxybenzyl)isocyanate, 3-3,5-di-tert-butyl-4-hydroxyphenyl), distearyl thiodipropionate, lauryl thiopropionate methane, and di-phenylisooctyl phosphinate, without being limited thereto. These may be used alone or in combination thereof.

After polymerization, cooling, washing, dehydration, drying and the like are performed, thereby providing the biphenyl group-containing (meth)acrylate copolymer (B) in particle form.

In some embodiments, the biphenyl group-containing (meth)acrylate copolymer (B) has a non-crosslinked structure, preferably a linear structure. Such a biphenyl group-containing (meth)acrylate copolymer (B) having a non-crosslinked structure allows extrusion and injection molding, and exhibits excellent compatibility with the polycarbonate resin (A).

In some embodiments, the biphenyl group-containing (meth)acrylate copolymer (B) may have a glass transition temperature of about 90° C. to about 150° C., preferably about 101° C. to about 130° C. The biphenyl group-containing (meth)acrylate copolymer (B) allows extrusion or injection molding at the glass transition temperature or higher.

In some embodiments, the biphenyl group-containing (meth)acrylate copolymer (B) may have a Vicat softening temperature (VST) of about 100° C. to about 140° C., preferably from about 100° C. to 130° C., as measured under conditions of 5 Kg and 50° C./hr in accordance with ASTM D1525.

In some embodiments, the biphenyl group-containing (meth)acrylate copolymer (B) may have a weight average molecular weight from about 3,000 g/mol to about 300,000 g/mol, preferably from about 10,000 g/mol to about 290,000 g/mol, more preferably from about 40,000 g/mol to about 280,000 g/mol, for example, from 50,000 g/mol to 250,000 g/mol. Within this range, the resin composition can have both compatibility and mechanical properties.

The biphenyl group-containing (meth)acrylate copolymer (B) may have an index of refraction at a thickness of 2.5 mm from about 1.495 to about 1.640, preferably from about 1.50 to about 1.60, and a transmittance of 85% or higher, preferably 90% or higher, as measured in accordance with ASTM D1003.

(C) Rubber-Modified Vinyl Graft Copolymer

According to the present invention, the rubber-modified vinyl graft copolymer (C) has a core-shell graft copolymer structure wherein an unsaturated monomer is grafted onto a rubber core structure to form a shell, and may serve as an impact modifier in the resin composition.

The rubber is preferably prepared by polymerization of at least one rubber monomer of $C_4$ to $C_6$ diene rubbers, acrylate rubbers, and silicone rubbers. More preferably, the rubber is prepared using a silicone rubber alone or a silicone rubber in combination with an acrylate rubber, in terms of structural stability.

Examples of the acrylate rubber may include (meth)acrylate monomers, such as methyl (meth)acrylate, ethyl (meth)acrylate, n-propyl (meth)acrylate, n-butyl (meth)acrylate, 2-ethylhexyl (meth)acrylate, hexyl (meth)acrylate, and the like. When polymerizing the acrylate rubber, a curing agent, such as ethylene glycol di(meth)acrylate, propylene glycol di(meth)acrylate, 1,3-butylene glycol di(meth)acrylate, 1,4-butylene glycol di(meth)acrylate, allyl (meth)acrylate, triallyl cyanurate, and the like, may be further used.

The silicone rubber may be prepared from cyclosiloxane. For example, the silicone rubber may be prepared from at least one of hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. Here, a curing agent, such as trimethoxymethylsilane, triethoxyphenylsilane, tetramethoxysilane, tetraethoxysilane, and the like, may be further used.

The rubber may be present in an amount of 50 parts by weight to 95 parts by weight, preferably about 60 to about 90 parts by weight, more preferably about 70 to about 85 parts by weight, based on 100 parts by weight of the rubber-modified vinyl graft copolymer (C). Within this range, the rubber can have improved resin compatibility, thereby providing excellent impact modifying effects.

The rubber may have an average diameter of 0.1 μm to 1.0 μm, preferably about 0.4 μm to about 0.9 μm. Within this range, the rubber provides good balance between impact resistance and coloring properties.

The unsaturated monomer grafted to the rubber may include at least one of among $C_1$ to $C_{12}$ alkyl (meth)acrylates, (meth)acrylates, acid anhydrides, and $C_1$ to $C_{12}$ alkyl or phenyl-nuclear substituted maleimides.

Examples of the alkyl (meth)acrylates may include methyl methacrylate, ethyl methacrylate, propyl methacrylate, and the like. Preferably, methyl methacrylate is used.

Examples of the acid anhydrides may include carboxylic acid anhydrides, such as maleic anhydride, itaconic anhydride, and the like.

The unsaturated monomer may be present in an amount of about 5 to about 50 parts by weight, preferably about 10 to about 40 parts by weight, more preferably about 15 to about 30 parts by weight, based on 100 parts by weight of the rubber-modified vinyl graft copolymer (C). Within this range, the unsaturated monomer can have improved resin compatibility, thereby providing excellent impact modifying effects.

(D) Phosphorus-Based Flame Retardant

According to the present invention, the phosphorus-based flame retardant may be added to provide flame retardancy to the resin composition and may be any of those known in the art, including red phosphorus, phosphate, phosphonate, phosphinate, phosphine oxide, phosphazene, and metal salts thereof.

In one embodiment, the phosphorus-based flame retardant may be represented by Formula 4.

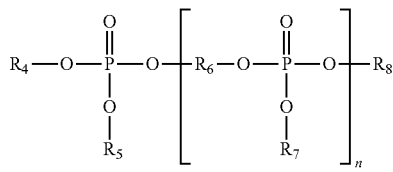

[Formula 4]

Wherein $R_4$, $R_5$, $R_7$ and $R_8$ are each independently a $C_6$ to $C_{20}$ aryl group or a $C_6$ to $C_{20}$ aryl group substituted with at least one $C_1$-$C_{20}$ alkyl group, $R_6$ is a moiety derived from resorcinol, hydroquinol, bisphenol A or bisphenol S as a dialcohol, and n is an integer from 0 to 10.

In some embodiments, when n=0, the phosphorus-based flame retardant may be triphenylphosphate, tricresylphosphate, cresyldiphenylphosphate, trixylylphosphate, tri(2,4,6-trimethylphenyl)phosphate, tri(2,4-di-tert-butylphenyl)phosphate, tri(2,6-di-tert-butylphenyl)phosphate, and the like. In other embodiments, when n=1, the phosphorus-based flame retardant may be resorcinol bis(diphenylphosphate), hydroquinol bis(diphenylphosphate), bisphenol A-bis(diphenylphosphate), resorcinol bis(2,6-di-tert-butylphenylphosphate), hydroquinol bis(2,6-dimethylphenyl phosphate), and the like. In other embodiments, when n=2, the phosphorus-based flame retardant may be present in the form of an oligomeric mixture.

Alternatively, the phosphorus-based flame retardant may be represented by Formula 5.

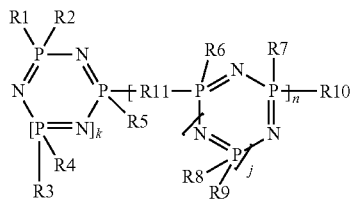

[Formula 5]

wherein R1, R2, R3, R4, R5, R6, R7, R8, R9 and R10 are each independently a substituent optionally selected from a $C_1$ to $C_6$ alkyl group, a $C_6$ to $C_{20}$ aryl group, a $C_6$ to $C_{20}$ aryl group substituted with $C_1$ to $C_6$ alkyl, a $C_6$ to $C_{20}$ aralkyl group, a $C_1$ to $C_6$ alkoxy group, a $C_6$ to $C_{20}$ aryloxy group, an amino group, or a hydroxyl group; $R_{11}$ is a $C_6$ to $C_{30}$ dioxyaryl group derivative substituted with $C_6$ to $C_{30}$ dioxyaryl or alkyl; n represents a number-average degree of polymerization and is an average value of 0.3 to 3; and k and j are each independently an integer from 0 to 10, provided that the alkoxy group or the aryloxy group can be substituted with an alkyl group, an aryl group, an amino group or a hydroxyl group.

The thermoplastic resin composition according to the present invention may optionally further include additives such as flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, antistatic agents, pigments, dyes, and the like. These additives may be used alone or in combination thereof. These additives may be added to the thermoplastic resin composition upon polymerization of the biphenyl group-containing (meth)acrylic copolymer (B), or may be added thereto upon typical pelletization (extrusion) of the thermoplastic resin composition, without being limited thereto. The additives may be present in an amount of about 0.001 to about 20 parts by weight based on 100 parts by weight of the thermoplastic resin composition including (A) and (B), without being limited thereto.

Another aspect of the present invention relates to molded products produced from the thermoplastic resin composition according to the present invention. Examples of molding methods include extrusion, injection molding, casting, and the like, without being limited thereto. These molding methods are well known to those skilled in the art. For example, the thermoplastic resin composition may be prepared in pellet form by simultaneously mixing the above components and other additives, followed by melt-extrusion in an extruder. The prepared pellets may be formed into various molded products (products) through various molding methods, such as injection molding, extrusion molding, and the like.

A molded product produced from the thermoplastic resin composition according to the first embodiment may have a scratch width from about 180 μm to about 350 μm, preferably about 190 μm to about 260 μm, as measured in accordance with Ball-type Scratch Profile Test, and a pencil hardness from 2B to 3H, preferably from H to 2H.

The molded product may include various plastic molded products. Since the thermoplastic resin composition according to the first embodiment exhibits excellent properties in terms of scratch resistance, impact strength, transparency, and moldability, the thermoplastic resin composition may be applied to molding of various products. Particularly, the molded products may be broadly applied as exterior materials of various electric and electronic components, parts or automobile components, lenses, window glass, and the like. For example, the molded products may include housings for electric/electronic home appliances, such as televisions, audio systems, washing machines, cassette players, MP3 players, telephones, game machines, video players, computers, photocopiers, and the like, and interior/exterior materials of automobiles, such as dashboards of automobiles, instrument panels, door panels, quarter panels, wheel covers, and the like.

A molded product produced from the thermoplastic resin composition according to the second embodiment may have a total light transmittance of about 40% or higher, for example, from about 45% to about 70%, a scratch width of about 280 μm or less, for example, from about 200 μm to about 270 μm, as measured in accordance with Ball-type Scratch Profile Test, a heat resistace (Vicat softening temperature: VST) of about 105° C. or more, for example, from about 105° C. to about 125° C., (under conditions of a load of 5 Kg at 50° C./hr) in accordance with ASTM D1525, and a ⅛" Izod notch impacted strength of about 8 kg·cm/cm or more, for example, from about 9 to about 25 kg·cm/cm, in accordance with ASTM D256.

The thermoplastic resin compositions according to the second and third embodiments may be used for molding of various products, particularly, electric/electronic products such as housings of televisions and office machines.

MODE FOR INVENTION

Next, the present invention will be better appreciated from the following examples and comparative examples. It should be understood that these examples are provided for illustration only and are not to be construed in any way as limiting the scope of the present invention. Descriptions of details apparent to those skilled in the art will be omitted.

EXAMPLES

Components used in Examples and Comparative Examples are as follows.

(A) Polycarbonate Resin

PANLITE L-1250WP which has a weight average molecular weight of 25,000 g/mol and is a bisphenol A linear polycarbonate resin produced by TEIJIN in Japan was used as a polycarbonate resin.

(B) Biphenyl Group-Containing (Meth)Acrylic Copolymer (B1) Biphenyl Group-Containing (Meth)Acrylic Copolymer-1

A copolymer was prepared by typical suspension polymerization using 15 wt % of o-biphenyl methacrylate monomer having an index of refraction of 1.640, 82.5 wt % of methyl methacrylate monomer, and 2.5 wt % of methyl acrylate. The copolymer had a weight average molecular weight of 25,000 g/mol and an index of refraction of 1.5117.

(B2) Biphenyl Group-Containing (Meth)Acrylic Copolymer-2

A copolymer was prepared by typical suspension polymerization using 30 wt % of o-biphenyl methacrylate monomer having an index of refraction of 1.640, 67.5 wt % of methyl methacrylate monomer, and 2.5 wt % of acrylate. The copolymer had a weight average molecular weight of 85,000 g/mol and an index of refraction of 1.5343.

(B3) Biphenyl Group-Containing (Meth)Acrylic Copolymer-3

A copolymer was prepared by typical suspension polymerization using 15 wt % of p-biphenyl methacrylate having an index of refraction of 1.640 and 85 wt % of methyl methacrylate monomer. The copolymer had a weight average molecular weight of 55,000 g/mol and an index of refraction of 1.5119.

(B4) Biphenyl Group-Containing (Meth)Acrylic Copolymer-4

A copolymer was prepared by typical suspension polymerization using 15 wt % of p-biphenyl methacrylate having an index of refraction of 1.640, 70 wt % of methyl methacrylate monomer, and 15 wt % of phenyl methacrylate. The copolymer had a weight average molecular weight of 55,000 g/mol and an index of refraction of 1.5241.

(B5) Biphenyl Group-Containing (Meth)Acrylic Copolymer-5

A copolymer was prepared by typical suspension polymerization using 15 wt % of o-biphenyl methacrylate monomer having an index of refraction of 1.640, 82.5 wt % of methyl methacrylate monomer, and 2.5 wt % of methyl acrylate. The copolymer had a weight average molecular weight of 55,000 g/mol and an index of refraction of 1.5117.

(B6) Biphenyl Group-Containing (Meth)Acrylic Copolymer-6

A copolymer was prepared by typical suspension polymerization using 15 wt % of p-biphenyl methacrylate having an index of refraction of 1.640 and 85 wt % of methyl methacrylate monomer. The copolymer had a weight average molecular weight of 100,000 g/mol and an index of refraction of 1.5119.

(B7) Biphenyl Group-Containing (Meth)Acrylic Copolymer-7

A copolymer was prepared by typical suspension polymerization using 15 wt % of p-biphenyl methacrylate having an index of refraction of 1.640, 70 wt % of methyl methacrylate monomer, and 15 wt % of phenyl methacrylate. The copolymer had a weight average molecular weight of 100,000 g/mol and an index of refraction of 1.5241.

(C) Rubber-Modified Vinyl Graft Copolymer

METABLEN C-223A (MITSUBISHI RAYON) in which 20 wt % of styrene monomer and 10 wt % of methyl methacrylate monomer are grafted to 70 wt % of a butadiene rubber complex having an average particle size of 0.1-0.3 µm was used.

(D) Phosphorus-Based Flame Retardant

Resorcinol-bis(diphenylphosphate) was used.

(E) Acrylic Resin (E1) Acrylic Resin-1

L84 (LG MMA), which is a polymethyl methacrylate resin having an average molecular weight of 92,000 g/mol, was used.

(E2) Acrylic Resin-2

A copolymer was prepared by typical suspension polymerization using 30 wt % of phenyl methacrylate having an index of refraction of 1.570 and 70 wt % of methyl methacrylate monomer. The copolymer had a weight average molecular weight of 25,000 g/mol.

(E3) Acrylic Resin-3

A copolymer was prepared by typical suspension polymerization using 30 wt % of phenyl methacrylate having an index of refraction of 1.570 and 70 wt % of methyl methacrylate monomer. The copolymer had a weight average molecular weight of 85,000 g/mol.

(E4) Acrylic Resin-4

A copolymer was prepared by typical suspension polymerization using 50 wt % of phenyl methacrylate having an index of refraction of 1.570 and 50 wt % of methyl methacrylate monomer. The copolymer had a weight average molecular weight of 85,000 g/mol.

Examples 1 to 4 and Comparative Examples 1 to 3

After the respective components were prepared in amounts as listed in Table 1, 0.1 parts by weight of a hindered phenol-based heat stabilizer was added, followed by melting, kneading and extrusion, thereby preparing pellets. Here, extrusion was performed using a twin-screw extruder (L/D=29) having a diameter of 45 mm, and the prepared pellets were dried at 80° C. for 6 hours, followed by injection molding using a 6 oz. injection machine, thereby preparing specimens. The prepared specimens were evaluated as to the following properties. Results are shown in Table 1.

Property Evaluation (1) Flow mark: The presence of flow mark was evaluated using specimens having a size of L90 mm×W50 mm×t2.5 mm with the naked eye. The flow mark is a standard for evaluating improved compatibility between polycarbonate and the biphenyl group-containing (meth)acrylic copolymer.

(2) Transparency and color: Transparency, translucent or opaque was determined using the prepared specimens with the naked eye.

(3) Total light transmittance: Total light transmittance and haze were measured using a Hazemeter NDH 2000 (Nippon Denshoku Co. Ltd.). The total light transmittance was calculated from the sum of diffuse light transmittance (DF) and parallel light transmittance (PT). A higher total light transmittance (TT) and lower haze were evaluated as higher transparency.

(4) Izod impact strength (Kg·cm/cm): Izod impact strength was measured on ⅛" thick notched Izod specimens in accordance with ASTM D256.

(5) Heat resistace (Vicat softening temperature: VST, ° C.): Vicat softening temperature (VST) was measured under conditions of a load of 5 Kg at 50° C./hr) in accordance with ASTM D1525.

(6) Flame retardancy: Flame retardancy was measured on a 1.5 mm thick specimen in accordance with UL 94 vertical test method.

(7) Scratch resistance: Scratch resistance was measured in accordance with Ball-type Scratch Profile (BSP) Test. A 10 mm to 20 mm long scratch was applied to a surface of a specimen having a size of L90 mm×W50 mm×t2.5 mm under a load of 1,000 g at a scratch speed of 75 mm/min using a spherical metal tip having a diameter of 0.7 mm. As an indicator of scratch resistance, a scratch width (μm) was measured by surface scanning a profile of the applied scratch with a metal stylus tip having a diameter of 2 μm using a contact type surface profile analyzer XP-1 (Ambios Co., Ltd.). A greater scratch indicates higher scratch resistance.

(8) Pencil hardness: A specimen was left at 23° C. and 50% RH for 48 hours, followed by measurement of pencil hardness in accordance with JIS K 5401. Scratch resistance was rated as 3B, 2B, B, HB, F, H, 2H, 3H, and the like in accordance with pencil hardness. Higher hardness H indicates higher scratch resistance, and higher blackness B indicates lower scratch resistance.

TABLE 2

| Kind | | Example 5 | Example 6 | Comparative Example 4 |
|---|---|---|---|---|
| (A) PC | | 70 | 70 | 70 |
| (B) Biphenyl group-containing acrylic copolymer | (B1) | 30 | — | — |
| | (B2) | — | 30 | — |
| | (B3) | — | — | — |
| | (B4) | — | — | — |
| (C) Rubber-modified vinyl graft copolymer resin | | 10 | 10 | 10 |
| | (E1) | — | — | — |
| | (E2) | — | — | 30 |
| (E) Acrylic resin | (E3) | — | — | — |
| | (E4) | — | — | — |
| Flow Mark | | Absent | Absent | Absent |
| Total light transmittance (TT) | | 51.2 | 58.6 | 31.2 |
| Izod impact strength (⅛") | | 40.6 | 47.0 | 34.2 |
| Heat resistance (VST) | | 128.3 | 129.6 | 124.2 |
| BSP Width (μm) | | 280 | 278 | 291 |
| Pencil hardness | | F | F | F |

From the results of Table 2, it can be seen that the resin compositions of Examples 5 and 6 exhibited better properties than Comparative Example 4 in terms of transparency, impact strength, Heat resistance and scratch resistance, and exhibited better properties that Comparative Example 2 in terms of transparency and scratch resistance.

TABLE 1

| Kind | | Example 1 | Example 2 | Example 3 | Example 4 | Comparative Example 1 | Comparative Example 2 | Comparative Example 3 |
|---|---|---|---|---|---|---|---|---|
| (A) PC | | 70 | 70 | 70 | 70 | 70 | 70 | 70 |
| (B) Biphenyl group-containing acrylic copolymer | (B1) | 30 | — | — | — | — | — | — |
| | (B2) | — | 30 | — | — | — | — | — |
| | (B3) | — | — | 30 | — | — | — | — |
| | (B4) | — | — | — | 30 | — | — | — |
| (E) Acrylic resin | (E1) | — | — | — | — | 30 | — | — |
| | (E2) | — | — | — | — | — | 30 | — |
| | (E3) | — | — | — | — | — | — | — |
| | (E4) | — | — | — | — | — | — | 30 |
| Flow Mark | | Absent | Absent | Absent | Absent | Present | Absent | Absent |
| Transparency and color | | Transparent | Transparent | Transparent | Transparent | Opaque | Transparent | Translucent |
| Total light transmittance (TT) | | 91.0 | 90.2 | 88.2 | 89.6 | 5.3 | 89.9 | 40.8 |
| Izod impact strength (⅛") | | 2.5 | 3.8 | 3.5 | 3.3 | 3.7 | 2.4 | 3.5 |
| Heat resistance (VST) | | 123.8 | 127.6 | 125.7 | 125.2 | 127.4 | 122.1 | 127.4 |
| BSP Width (μm) | | 258 | 254 | 257 | 252 | 284 | 257 | 267 |
| Pencil hardness | | H | H | H | H | F | H | F |

From the results of Table 1, it can be seen that the resin compositions of Examples 1 to 4 exhibited better properties than Comparative Examples 1 to 3 in terms of outer appearance, transparency, impact strength, Heat resistance and scratch resistance.

Examples 5 and 6 and Comparative Examples 4 and 5

Thermoplastic resin compositions were prepared in the same manner as in Example 1 except that the rubber-modified vinyl graft copolymer resin (C) was further added. Results are shown in Table 2.

Example 7 and Comparative Examples 6 and 7

Thermoplastic resin compositions were prepared in the same manner as in Example 1 except that the phosphorus-based flame retardant (D) was further added. Results are shown in Table 3.

TABLE 3

| Kind | | Example 7 | Comparative Example 6 | Comparative Example 7 |
|---|---|---|---|---|
| (A) PC | | 70 | 70 | 100 |
| (B) Biphenyl group-containing | (B1) | — | — | — |
| | (B2) | — | — | — |

TABLE 3-continued

|  |  | Example | Comparative Example |  |
|---|---|---|---|---|
| Kind |  | 7 | 6 | 7 |
| acrylic copolymer | (B3) | 30 | — | — |
|  | (B4) | — | — | — |
| (D) Flame retardant |  | 15 | 15 | 15 |
| (E) Acrylic resin | (E1) | — | — | — |
|  | (E2) | — | 30 | — |
|  | (E3) | — | — | — |
|  | (E4) | — | — | — |
| Flow Mark |  | Absent | Absent | Absent |
| Transparency and color |  | Transparent | Transparent | Transparent |
| Total light transmittance (TT) |  | 91.2 | 91.0 | 90.3 |
| Izod impact strength (1/8") |  | 2.7 | 2.2 | 4.2 |
| Heat resistance (VST) |  | 97.0 | 91.6 | 112.4 |
| Flame retardancy |  | V2 | V2 | V2 |
| BSP Width (μm) |  | 255 | 258 | 303 |
| Pencil hardness |  | H | H | HB |

From the results of Table 3, it can be seen that the resin composition of Example 7 exhibited better properties than Comparative Example 6 in terms of impact strength, Heat resistance and scratch resistance, and exhibited better properties than Comparative Example 7 in terms of transparency and scratch resistance.

Examples 8 and 9 and Comparative Examples 8 and 9

Thermoplastic resin compositions were prepared in the same manner as in Example 1 except that the rubber-modified vinyl graft copolymer resin (C) and the phosphorus-based flame retardant (D) were further added. Results are shown in Table 4.

TABLE 4

|  |  | Example |  | Comparative Example |  |
|---|---|---|---|---|---|
| Kind |  | 8 | 9 | 8 | 9 |
| (A) PC |  | 70 | 70 | 70 | 70 |
| (B) Biphenyl group-containing | (B1) | — | — | — | — |
|  | (B2) | — | — | — | — |

TABLE 4-continued

|  |  | Example |  | Comparative Example |  |
|---|---|---|---|---|---|
| Kind |  | 8 | 9 | 8 | 9 |
| acrylic copolymer | (B3) | 30 | — | — | — |
|  | (B4) | — | 30 | — | — |
| (C) Rubber-modified vinyl graft copolymer resin |  | 10 | 10 | 10 | 10 |
| (D) Flame retardant |  | 15 | 15 | 15 | 15 |
| (E) Acrylic resin | (E1) | — | — | — | 30 |
|  | (E2) | — | — | — | — |
|  | (E3) | — | — | 30 | — |
|  | (E4) | — | — | — | — |
| Flow Mark |  | Absent | Absent | Absent | Present |
| Total light transmittance (TT) |  | 35.3 | 39.2 | 34.2 | 27.2 |
| Izod impact strength (1/8") |  | 23.4 | 20.1 | 11.2 | 25.3 |
| Heat resistance (VST) |  | 95.3 | 94.8 | 92.1 | 93.7 |
| Flame retardancy |  | V2 | V2 | V2 | V2 |
| BSP Width (μm) |  | 280 | 283 | 273 | 285 |
| Pencil hardness |  | F | F | F | F |

From the results of Table 4, it can be seen that the resin compositions of Examples 8 and 9 exhibited better properties than Comparative Example 8 in terms of total light transmittance, impact strength and Heat resistance, and exhibited better properties than Comparative Example 9 in terms of total light transmittance and scratch resistance.

Examples 10 to 15 and Comparative Examples 10 to 16

After the respective components were prepared in amounts as listed in Tables 5 and 6, 0.1 parts by weight of a hindered phenol-based heat stabilizer was added, followed by melting, kneading and extrusion, thereby preparing pellets. Here, extrusion was performed using a twin-screw extruder (L/D=29) having a diameter of 45 mm, and the prepared pellets were dried at 80° C. for 6 hours, followed by injection molding using a 6 oz. injection machine, thereby preparing specimens. The prepared specimens were evaluated as to haze, impact resistance, Heat resistance, scratch resistance and pencil hardness by the aforementioned methods. Results are shown in Tables 5 and 6.

TABLE 5

|  |  | Example |  |  |  | Comparative Example |  |  |  |
|---|---|---|---|---|---|---|---|---|---|
| Kind |  | 10 | 11 | 12 | 13 | 10 | 11 | 12 | 13 |
| (A) PC |  | 30 | 30 | 30 | 30 | 30 | 30 | — | 70 |
| (B) Biphenyl group-containing | (B5) | 70 | — | — | — | — | — | — | — |
|  | (B2) | — | 70 | — | — | — | — | — | — |
| (meth)acrylic copolymer | (B6) | — | — | 70 | — | — | — | — | 30 |
|  | (B7) | — | — | — | 70 | — | — | — | — |
| (E) Acrylic resin | (E1) | — | — | — | — | 70 | — | 100 | — |
|  | (E2) | — | — | — | — | — | — | — | — |
|  | (E4) | — | — | — | — | — | 70 | — | — |
| Flow Mark |  | Absent | Absent | Absent | Absent | Present | Absent | Absent | Absent |
| Transparency |  | Transparent | Transparent | Transparent | Transparent | Opaque | Translucent | Transparent | Transparent |
| Total light transmittance (TT) |  | 90.5 | 89.3 | 90.2 | 88.7 | 5.8 | 72.1 | 91.3 | 88.2 |
| Izod impact strength (1/8") |  | 2.5 | 2.6 | 2.9 | 3.0 | 3.2 | 1.5 | 1.2 | 3.5 |
| BSP Width (μm) |  | 203 | 209 | 198 | 206 | 225 | 218 | 176 | 257 |
| Heat resistance (VST) |  | 112.5 | 112.7 | 114.2 | 111.1 | 110.3 | 109.0 | 105.2 | 125.7 |
| Pencil hardness |  | 2H | 2H | 2H | 2H | 2H | 2H | 3H | H |

From the results of Table 5, it can be seen that the resin composition (Comparative Example 10) prepared by mixing typical polymethyl methacrylate and polycarbonate suffered from generation of flow marks and opaque appearance due to deterioration in compatibility between the two resins, as can be confirmed by deterioration in total light transmittance. The resin composition of Comparative Example 11 prepared using the acrylic copolymer having a high index of refraction from 1.495 to 1.590 and a weight average molecular weight from 25,000 g/mol to 95,000 g/mol had slightly improved transparency and outer appearance as compared with the resin composition of Comparative Example 10 prepared using PMMA, but still had insufficient transparency and scratch resistance. In Comparative Example 12 in which polymethyl methacrylate was used alone without blending polycarbonate, it can be seen that the resin composition exhibited significant deterioration in impact strength and Heat resistance. Further, in Comparative Example 13 in which the content ratio of the biphenyl group-containing (meth)acrylic copolymer to the polycarbonate resin was not within the range of the present invention, it can be seen that the resin composition exhibited significant deterioration in scratch resistance.

TABLE 6

| Kind | | Example 14 | Example 15 | Comparative Example 14 | Comparative Example 15 | Comparative Example 16 |
|---|---|---|---|---|---|---|
| (A) PC | | 30 | 30 | 30 | 30 | — |
| (B) Biphenyl group- | (B5) | — | — | — | — | — |
| containing (meth)acrylic | (B2) | — | — | — | — | — |
| copolymer | (B6) | 70 | — | — | — | — |
| | (B7) | — | 70 | — | — | — |
| (C) Rubber-modified vinyl graft copolymer | | 15 | 15 | 15 | 15 | 15 |
| (E) Acrylic resin | (E1) | — | — | 70 | — | 100 |
| | (E2) | — | — | — | 70 | — |
| | (E4) | — | — | — | — | — |
| Flow Mark | | Absent | Absent | Present | Absent | Absent |
| Transparency and color | | Opaque | Opaque | Opaque | Opaque | Opaque |
| Total light transmittance (TT) | | 49.9 | 50.2 | 9.6 | 48.4 | 46.6 |
| Izod impact strength (1/8") | | 12.0 | 10.9 | 17.6 | 5.9 | 5.5 |
| BSP Width (μm) | | 253 | 263 | 257 | 250 | 242 |
| Heat resistance (VST) | | 109.8 | 111.8 | 105.7 | 106.0 | 104.7 |
| Pencil hardness | | H | H | H | H | H |

From the results of Table 6, it can be seen that the resin composition of Comparative Example 14 prepared using a typical PMMA resin suffered from generation of flow marks and deterioration in total light transmittance. The resin composition of Comparative Example 15 prepared using the acrylic copolymer having a high index of refraction and a weight average molecular weight from 25,000 g/mol to 95,000 g/mol had slightly improved transparency and outer appearance as compared with the resin composition of Comparative Example 14 prepared using PMMA, but suffered from deterioration in impact strength and Heat resistance, and insufficient transparency and scratch resistance. In Comparative Example 16 in which polycarbonate was not blended, it can be seen that the resin composition exhibited deteriorated impact strength and Heat resistance.

It should be understood that various modifications, changes, alterations, and equivalent embodiments can be made by those skilled in the art without departing from the spirit and scope of the invention.

The invention claimed is:
1. A thermoplastic resin composition comprising:
(A) a polycarbonate resin; and
(B) a (meth)acrylic copolymer having a biphenyl group or a terphenyl group, the (B) (meth)acrylic copolymer having a weight average molecular weight of about 50,000 g/mol to about 250,000 g/mol, the (B) (meth) acrylic copolymer being derived from a monomer mixture including:
(b1) a biphenyl or terphenyl group-containing (meth) acrylate having an index of refraction from about 1.580 to about 1.700;
(b2) a monofunctional unsaturated monomer; and
(b3) an alicyclic or aromatic (meth)acrylate having an index of refraction from about 1.490 to about 1.579.
2. The thermoplastic resin composition according to claim 1, wherein the (B) (meth)acrylic copolymer has an index of refraction from about 1.495 to about 1.640.
3. The thermoplastic resin composition according to claim 1, comprising:
about 50 wt % to about 99 wt % of the (A) polycarbonate resin; and
about 1 wt % to about 50 wt % of the (B) (meth)acrylic copolymer.
4. A molded product formed from the thermoplastic resin composition according to claim 3, the molded product having a scratch width from about 180 μm to about 350 μm as measured in accordance with a Ball-type Scratch Profile Test, and a pencil hardness from 2B to 3H.
5. The thermoplastic resin composition according to claim 1, comprising:
about 1 wt % to about 49 wt % of the (A) polycarbonate resin; and
about 51 wt % to about 99 wt % of the (B) (meth)acrylic copolymer.
6. A molded product formed from the thermoplastic resin composition according to claim 5, the molded product having a total light transmittance of about 85% or greater, a scratch width of about 210 μm or less as measured in accordance with a Ball-type Scratch Profile Test, and a Vicat softening temperature (VST) as a measure of heat resistance of about 110° C. or greater as measured under conditions of a load of 5 Kg at 50° C./hr in accordance with ASTM D1525.
7. The thermoplastic resin composition according to claim 1, wherein the monomer mixture comprises about 1 wt % to about 50 wt % of (b1) the biphenyl or terphenyl group-containing (meth)acrylate having an index of refraction from about 1.580 to about 1.700, about 99 wt % or less of (b2) the monofunctional unsaturated monomer, and about 50 wt % or less of (b3) the alicyclic or aromatic (meth)acrylate having an index of refraction from about 1.490 to about 1.579.

8. The thermoplastic resin composition according to claim 1, wherein the (b1) biphenyl or terphenyl group-containing (meth)acrylate is represented by Formula 1:

[Formula 1]

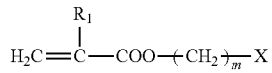

where $R_1$ is hydrogen or a methyl group; m is an integer from 0 to 10; and X is selected from the group consisting of a substituted or unsubstituted biphenyl group, and a substituted or unsubstituted terphenyl group.

9. The thermoplastic resin composition according to claim 1, wherein the (b2) monofunctional unsaturated monomer comprises at least one of a $C_1$ to $C_8$ alkyl (meth)acrylate; an unsaturated carboxylic acid including (meth)acrylic acid; an acid anhydride including maleic anhydride; a hydroxyl group-containing (meth)acrylate; (meth)acrylamide; unsaturated nitrile; allyl glycidyl ether; glycidyl methacrylate; and an aromatic vinyl monomer.

10. The thermoplastic resin composition according to claim 1, wherein the (b3) alicyclic or aromatic (meth)acrylate having the index of refraction from about 1.490 to about 1.579 comprises a compound represented by Formula 2, a compound represented by Formula 3, or mixtures thereof:

[Formula 2]

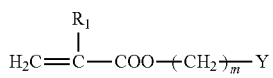

where $R_1$ is hydrogen or a methyl group; m is an integer from 0 to 10, and Y is a substituted or unsubstituted C6 to C20 cycloalkyl group, or a substituted or unsubstituted $C_6$ to $C_{20}$ aryl group;

[Formula 3]

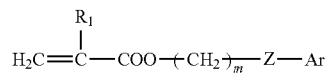

where $R_1$ is hydrogen or a methyl group; m is an integer from 0 to 10; Z is oxygen (O) or sulfur (S); Ar is a substituted or unsubstituted $C_6$ to $C_{20}$ cycloalkyl group, or a substituted or unsubstituted $C_6$ to $C_{20}$ aryl group.

11. The thermoplastic resin composition according to claim 1, wherein the (B) (meth)acrylic copolymer has a non-crosslinked structure.

12. The thermoplastic resin composition according to claim 1, wherein the (B) (meth)acrylic copolymer has a glass transition temperature from about 90° C. to about 150° C., and permits extrusion or injection at a temperature higher than or equal to the glass transition temperature.

13. The thermoplastic resin composition according to claim 1, further comprising: (C) a rubber-modified vinyl graft copolymer resin.

14. The thermoplastic resin composition according to claim 13, wherein the (C) rubber-modified vinyl graft copolymer resin has a core-shell structure in which an unsaturated monomer is grafted onto a core rubber to form a shell, the unsaturated monomer comprising at least one of a $C_1$ to $C_{12}$ alkyl (meth)acrylate, an acid anhydride, and a $C_1$ to $C_{12}$ alkyl or phenyl-nuclear substituted maleimide.

15. A molded product formed from the thermoplastic resin composition according to claim 13, the molded product having a total light transmittance of about 40% or greater, a scratch width from about 280 μm or less as measured in accordance with a Ball-type Scratch Profile Test, a Vicat softening temperature (VST) as a measure of heat resistance of about 105° C. or greater as measured under conditions of a load of 5 Kg at 50° C./hr in accordance with ASTM D1525, and a ⅛" Izod notch impacted strength of about 8 kg·cm/cm or higher as measured in accordance with ASTM D256.

16. The thermoplastic resin composition according to claim 1, further comprising: at least one additive selected from the group consisting of flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, antistatic agents, pigments, and dyes.

17. A molded product formed from the thermoplastic resin composition according to claim 1.

* * * * *